(12) United States Patent
Fang et al.

(10) Patent No.: US 11,698,553 B2
(45) Date of Patent: Jul. 11, 2023

(54) BACKLIGHT MODULE AND DISPLAY APPARATUS

(71) Applicant: Coretronic Corporation, Hsin-Chu (TW)

(72) Inventors: Chung-Yang Fang, Hsin-Chu (TW); Ping-Yen Chen, Hsin-Chu (TW); Chih-Jen Tsang, Hsin-Chu (TW); Chung-Wei Huang, Hsin-Chu (TW); Bo-Han Cheng, Hsin-Chu (TW); Wen-Chun Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/978,964

(22) Filed: Nov. 1, 2022

(65) Prior Publication Data
US 2023/0141295 A1    May 11, 2023

(30) Foreign Application Priority Data
Nov. 10, 2021 (CN) .......................... 202111324271.9

(51) Int. Cl.
| | |
|---|---|
| *G02F 1/133* | (2006.01) |
| *G02F 1/13357* | (2006.01) |
| *G02F 1/137* | (2006.01) |
| *G02F 1/1335* | (2006.01) |
| *G02F 1/13363* | (2006.01) |

(52) U.S. Cl.
CPC .... *G02F 1/133603* (2013.01); *G02F 1/13718* (2013.01); *G02F 1/133607* (2021.01); *G02F 1/133611* (2013.01); *G02F 1/133638* (2021.01)

(58) Field of Classification Search
CPC ......... G02F 1/133603; G02F 1/133607; G02F 1/133638; G02F 1/133611; G02F 1/13718
USPC ....................................................... 362/97.1
See application file for complete search history.

(56) References Cited

U.S. PATENT DOCUMENTS

| | | | |
|---|---|---|---|
| 6,025,899 A * | 2/2000 | Fukunaga | ......... G02F 1/133514 |
| | | | 430/7 |
| 2007/0008460 A1 | 1/2007 | Takeda et al. | |
| 2022/0365385 A1* | 11/2022 | Echeverri | ............. G02F 1/1334 |

FOREIGN PATENT DOCUMENTS

| | | | | |
|---|---|---|---|---|
| CN | 115356870 A | * | 11/2022 | ........... G02F 1/1334 |
| TW | 200700841 | | 1/2007 | |
| TW | 200707018 | | 2/2007 | |

(Continued)

*Primary Examiner* — Christopher M Raabe
(74) *Attorney, Agent, or Firm* — JCIPRNET

(57) ABSTRACT

A backlight module including a circuit substrate, a plurality of light-emitting devices, a first cholesteric liquid-crystal layer, and a second cholesteric liquid-crystal layer is provided. The light-emitting devices are disposed on the circuit substrate and electrically connected to the circuit substrate. The first cholesteric liquid-crystal layer is disposed on the light-emitting devices and overlapped with a light-emitting surface of each of the light-emitting devices. The second cholesteric liquid-crystal layer is disposed on the first cholesteric liquid-crystal layer and overlapped with the first cholesteric liquid-crystal layer. The first cholesteric liquid-crystal layer and the second cholesteric liquid-crystal layer respectively have a first chiral direction and a second chiral direction. A display apparatus adopting the backlight module is also provided.

20 Claims, 11 Drawing Sheets

(56) References Cited

FOREIGN PATENT DOCUMENTS

| TW | 201902705 | 1/2019 |
| TW | 202116984 | 5/2021 |

* cited by examiner

BACKLIGHT MODULE AND DISPLAY APPARATUS

CROSS-REFERENCE TO RELATED APPLICATION

This application claims the priority benefit of China application serial no. 202111324271.9 filed on Nov. 10, 2021. The entirety of the above-mentioned patent application is hereby incorporated by reference herein and made a part of this specification.

BACKGROUND OF THE INVENTION

Field of the Invention

The invention relates to a light source module and a display apparatus, and more particularly to a backlight module and a display apparatus.

Description of Related Art

With the increasing application of non-self-luminous displays such as liquid-crystal displays, the design of the backlight module also needs to be adjusted for different applications. In order to meet the display requirements of large size, high dynamic range (HDR), and high contrast, the backlight module needs to have the function of local dimming. Therefore, direct-lit backlight modules using light-emitting diodes as the main light source have gradually become the mainstream in the market. Since the overall thickness of this type of backlight module is thinner (for example, the optical distance is less than 10 mm), and the light-emitting diode is a point light source, the backlight module readily forms a brighter light output above the light-emitting diode, i.e., a hot spot phenomenon, causing the overall brightness uniformity of the light-emitting surface to be decreased. In order to solve this issue, a technical solution of covering the light-emitting diode with a light-shielding film having light-shielding dots is provided. However, this technique requires very high assembly accuracy of the backlight module.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a backlight module having better light output uniformity but lower production cost.

The invention provides a display apparatus having better display quality.

Other objects and advantages of the invention may be further understood from the technical features disclosed in the invention.

In order to achieve one or a portion of or all of the above objectives or other objectives, an embodiment of the invention provides a backlight module. The backlight module includes a circuit substrate, a plurality of light-emitting devices, a first cholesteric liquid-crystal layer, and a second cholesteric liquid-crystal layer. The light-emitting devices are disposed on the circuit substrate and electrically connected to the circuit substrate. The first cholesteric liquid-crystal layer is disposed on the light-emitting devices and overlapped with a light-emitting surface of each of the light-emitting devices. The second cholesteric liquid-crystal layer is disposed on the first cholesteric liquid-crystal layer and overlapped with the first cholesteric liquid-crystal layer. The first cholesteric liquid-crystal layer and the second cholesteric liquid-crystal layer respectively have a first chiral direction and a second chiral direction.

In order to achieve one or a portion of or all of the above objectives or other objectives, an embodiment of the invention provides a display apparatus. The display apparatus includes a backlight module, a display panel, and a quarter-wave plate. The backlight module includes a circuit substrate, a plurality of light-emitting devices, a first cholesteric liquid-crystal layer, and a second cholesteric liquid-crystal layer. The light-emitting devices are disposed on the circuit substrate and electrically connected to the circuit substrate. The first cholesteric liquid-crystal layer is disposed on the light-emitting devices and overlapped with a light-emitting surface of each of the light-emitting devices. The second cholesteric liquid-crystal layer is disposed on the first cholesteric liquid-crystal layer and overlapped with the first cholesteric liquid-crystal layer. The first cholesteric liquid-crystal layer and the second cholesteric liquid-crystal layer respectively have a first chiral direction and a second chiral direction. The display panel is overlapped at the backlight module and has a liquid-crystal cell and a polarizer located between the liquid-crystal cell and the backlight module. The quarter-wave plate is disposed between the backlight module and the display panel. An included angle between a slow axis of the quarter-wave plate and an absorption axis of the polarizer is 45 degrees.

Based on the above, in the backlight module and the display apparatus of an embodiment of the invention, by arranging two cholesteric liquid-crystal layers having the same or opposite chiral directions on the light-emitting side of the light-emitting devices, a portion of the forward light emitted by the light-emitting devices may be directed to a region not overlapped with the light-emitting devices, so as to effectively improve the overall light uniformity of the backlight module. Moreover, compared with the general use of a light-shielding film technique having light-shielding dots, the cholesteric liquid-crystal layers and the light-emitting devices of the invention do not have issues in assembly accuracy. Therefore, the manufacturing process flexibility of the backlight module is better and the production cost is also lower.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
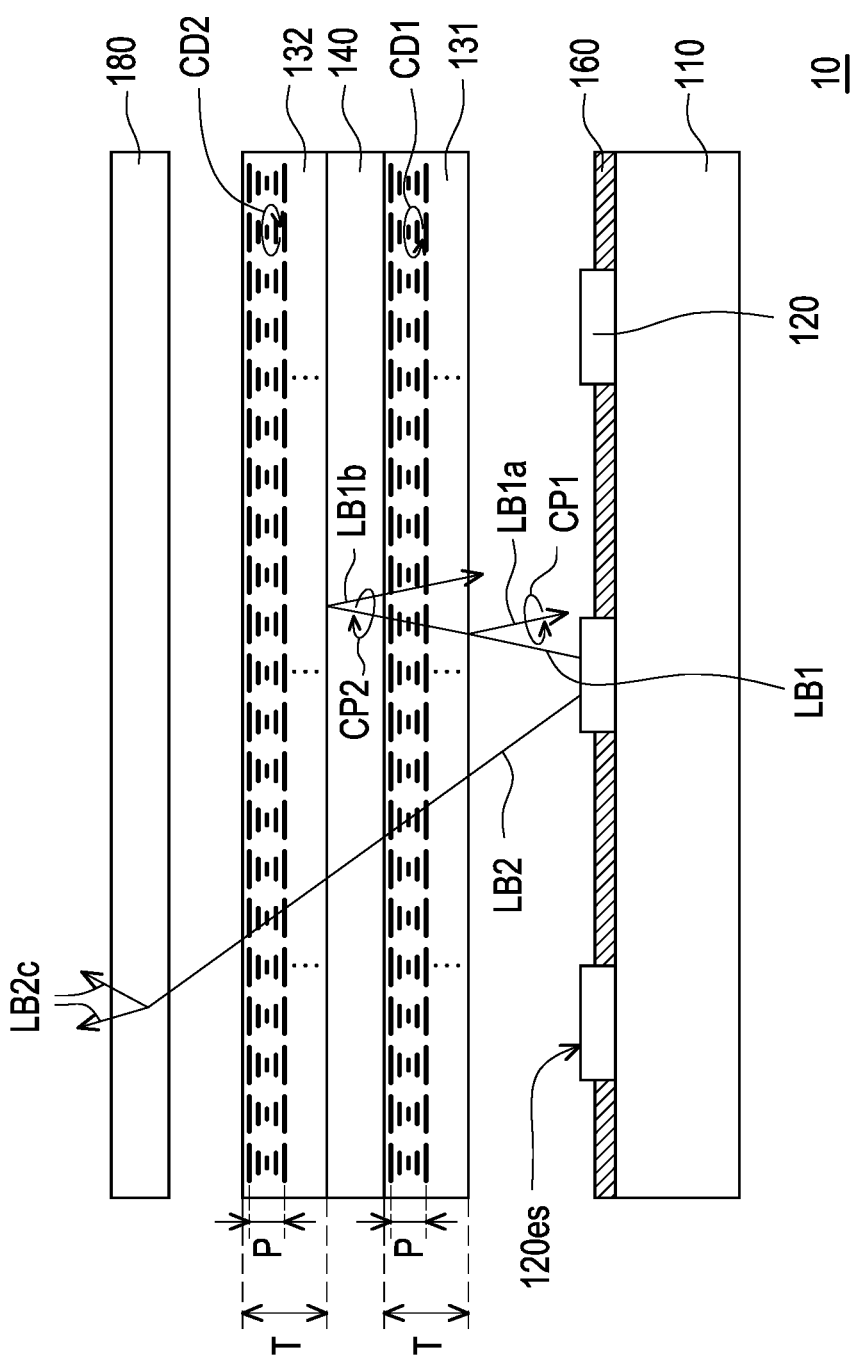
FIG. 1 is a schematic cross-sectional view of a backlight module according to the first embodiment of the invention.

FIG. 1 is a schematic cross-sectional view of a backlight module according to the first embodiment of the invention. Referring to FIG. 1, a backlight module 10 includes a circuit substrate 110, a plurality of light-emitting devices 120, a first cholesteric liquid-crystal layer 131, and a second cholesteric liquid-crystal layer 132. The light-emitting devices 120 are disposed on the circuit substrate 110 and electrically connected to the circuit substrate 110. For example, the light-emitting devices 120 may be arranged in an array on the circuit substrate 110, and the circuit substrate 110 is suitable for individually controlling the light-emitting devices 120 to emit light. In other words, the backlight module 10 of the present embodiment may have a local dimming function, but the invention is not limited thereto. In the present embodiment, the light-emitting devices 120 are, for example, mini-light-emitting diodes (mini-LEDs), but the invention is not limited thereto. In other embodiments, the light-emitting devices 120 may also be micro-LEDs.

The light-emitting devices 120 have a light-emitting surface 120es facing away from the circuit substrate 110. At a side of the light-emitting surface 120es of the light-emitting devices 120, a first cholesteric liquid-crystal layer 131 and a second cholesteric liquid-crystal layer 132 are provided. More specifically, the first cholesteric liquid-crystal layer 131 is disposed on the light-emitting devices 120 and overlapped with the light-emitting surface 120es of the light-emitting devices 120. The second cholesteric liquid-crystal layer 132 is disposed on the first cholesteric liquid-crystal layer 131 and overlapped with the first cholesteric liquid-crystal layer 131. In the present embodiment, the first cholesteric liquid-crystal layer 131 and the second cholesteric liquid-crystal layer 132 each have substantially a same film thickness T and substantially a same pitch P, and the film thickness T of each of the first cholesteric liquid-crystal layer 131 and the second cholesteric liquid-crystal layer 132 may be greater than 10 times the pitch P, wherein the pitch P refers to the pitch of a cholesteric helix of each of the first cholesteric liquid-crystal layer 131 and the second cholesteric liquid-crystal layer 132, so that the cholesteric liquid-crystal layer has a reflectivity close to 50% for light of a specific polarization state, but the invention is not limited thereto. In other embodiments, the film thickness T of each of the two cholesteric liquid-crystal layers may satisfy the following relationship: $3 \times P \leq T \leq 20 \times P$. In other words, the film thickness of the cholesteric liquid-crystal layers may be adjusted according to actual reflectivity or transmittance requirements.

Moreover, in the present embodiment, the materials of the first cholesteric liquid-crystal layer 131 and the second cholesteric liquid-crystal layer 132 may be optionally the same and have the same average refractive index. Accordingly, each of the first cholesteric liquid-crystal layer 131 and the second cholesteric liquid-crystal layer 132 may reflect light having substantially the same wavelength. However, the invention is not limited thereto. In other embodiments, the choice of materials for the two cholesteric liquid-crystal layers may also be different, for example: two cholesteric liquid-crystal materials having different average refractive indices and pitches of the cholesteric helix, as long as the product value of the average refractive index and the pitch of the cholesteric helix of each of the two cholesteric liquid-crystal layers is substantially the same.

It should be mentioned that, in the present embodiment, the first cholesteric liquid-crystal layer 131 and the second cholesteric liquid-crystal layer 132 have a first chiral direction CD1 and a second chiral direction CD2, respectively, and the first chiral direction CD1 and the second chiral direction CD2 may be optionally different, but the invention is not limited thereto. Since the cholesteric liquid-crystal layers may reflect light having a polarization rotation state the same as its own chiral direction, a light LB1 emitted from the light-emitting devices 120 in a more forward direction (a smaller angle with the normal direction of the light-emitting surface 120es) respectively forms two sub-lights having different polarization rotation states after being incident on the first cholesteric liquid-crystal layer 131 and the second cholesteric liquid-crystal layer 132.

For example, after the light LB1 is incident on the first cholesteric liquid-crystal layer 131, the light component (i.e., a sub-light LB1a) having a first circular polarization state CP1 is reflected by the first cholesteric liquid-crystal layer 131, and the light component (i.e., a sub-light LB1b) having a second circular polarization state CP2 passes through the first cholesteric liquid-crystal layer 131 and is incident on the second cholesteric liquid-crystal layer 132. Since the second chiral direction CD2 of the second cholesteric liquid-crystal layer 132 is the same as the polarization rotation state of the sub-light LB1b, the sub-light LB1b passing through the first cholesteric liquid-crystal layer 131 is reflected by the second cholesteric liquid-crystal layer 132.

In other words, the light LB1 emitted from the light-emitting devices 120 in a more forward direction is directed by the first cholesteric liquid-crystal layer 131 and the second cholesteric liquid-crystal layer 132 to a region not overlapped with the light-emitting devices 120 (for example, the region between two adjacent light-emitting devices 120). Moreover, a light LB2 from the light-emitting devices 120 exiting at a greater angle with the normal direction of the light-emitting surface 120es may pass through two cholesteric liquid-crystal layers. In other words, the first cholesteric liquid-crystal layer 131 and the second cholesteric liquid-crystal layer 132 do not substantially reflect light incident at a large angle.

As mentioned above, the reflectivity of the cholesteric liquid-crystal layers to light depends on their own film thickness. Therefore, the light output intensity of the backlight module 10 in the region overlapped with the light-emitting devices 120 (that is, the region directly above the light-emitting devices 120) may be controlled by adjusting the film thickness T of the two cholesteric liquid-crystal layers, so that the difference thereof from the light output intensity of the non-overlapped region is reduced, thereby improving the overall light output uniformity of the backlight module 10.

From another perspective, compared with generally adopting a light-shielding film technique having light-shielding dots, there is no issue of assembly accuracy between the cholesteric liquid-crystal layers and the light-emitting devices 120 of the present embodiment. Moreover, the manufacturing process of the cholesteric liquid-crystal layers is simple, and the control of the reflection wavelength range is also easy. Therefore, the backlight module 10 of the present embodiment may have better process flexibility and cost advantages.

In the present embodiment, the backlight module 10 may also optionally include a light-transmitting substrate 140 disposed between the first cholesteric liquid-crystal layer 131 and the second cholesteric liquid-crystal layer 132. More specifically, the two cholesteric liquid-crystal layers may be directly disposed on two opposite surfaces of the light-transmitting substrate 140, but the invention is not limited thereto. The material of the light-transmitting substrate 140 includes glass, polymer (for example: polyimide, polycarbonate, TAC, COP, PMMA, etc.), or other plates having high light transmittance.

Furthermore, the light-emitting devices 120 of the present embodiment may adopt blue light-emitting diodes to achieve white light illumination together with the wavelength conversion layer 180. Specifically, the wavelength conversion layer 180 is disposed at a side of the first cholesteric liquid-crystal layer 131 and the second cholesteric liquid-crystal layer 132 away from the light-emitting devices 120, and overlapped with the respective light-emitting surfaces 120es of the light-emitting devices 120. For example, the light LB2 passing through the first cholesteric liquid-crystal layer 131 and the second cholesteric liquid-crystal layer 132 obliquely and having a blue wavelength is absorbed after entering the wavelength conversion layer 180, and is converted into a converted light LB2c having red light (or green light) wavelength. In other words, the wavelength conversion layer 180 of the present embodiment may include at least two wavelength conversion materials, so that the wavelength conversion layer 180 emits converted light of at least two wavelengths after absorbing blue light.

In the present embodiment, the backlight module 10 may further include a reflective layer 160 disposed on the circuit substrate 110 and not overlapped with the light-emitting devices 120. More specifically, the reflective layer 160 is located between the plurality of light-emitting devices 120. Through the arrangement of the reflective layer 160, in addition to increasing the light-emitting efficiency of the light-emitting devices 120, the opportunity for light to be transmitted laterally between the cholesteric liquid-crystal layers and the reflective layer 160 may also be increased to further improve the overall light output uniformity of the backlight module 10.

In the following, other embodiments are provided to explain the disclosure in detail. The same members are labeled with the same reference numerals, and description of the same technical content is omitted. For the omitted parts, please refer to the above embodiments, which are not repeated herein.

Figure 2:
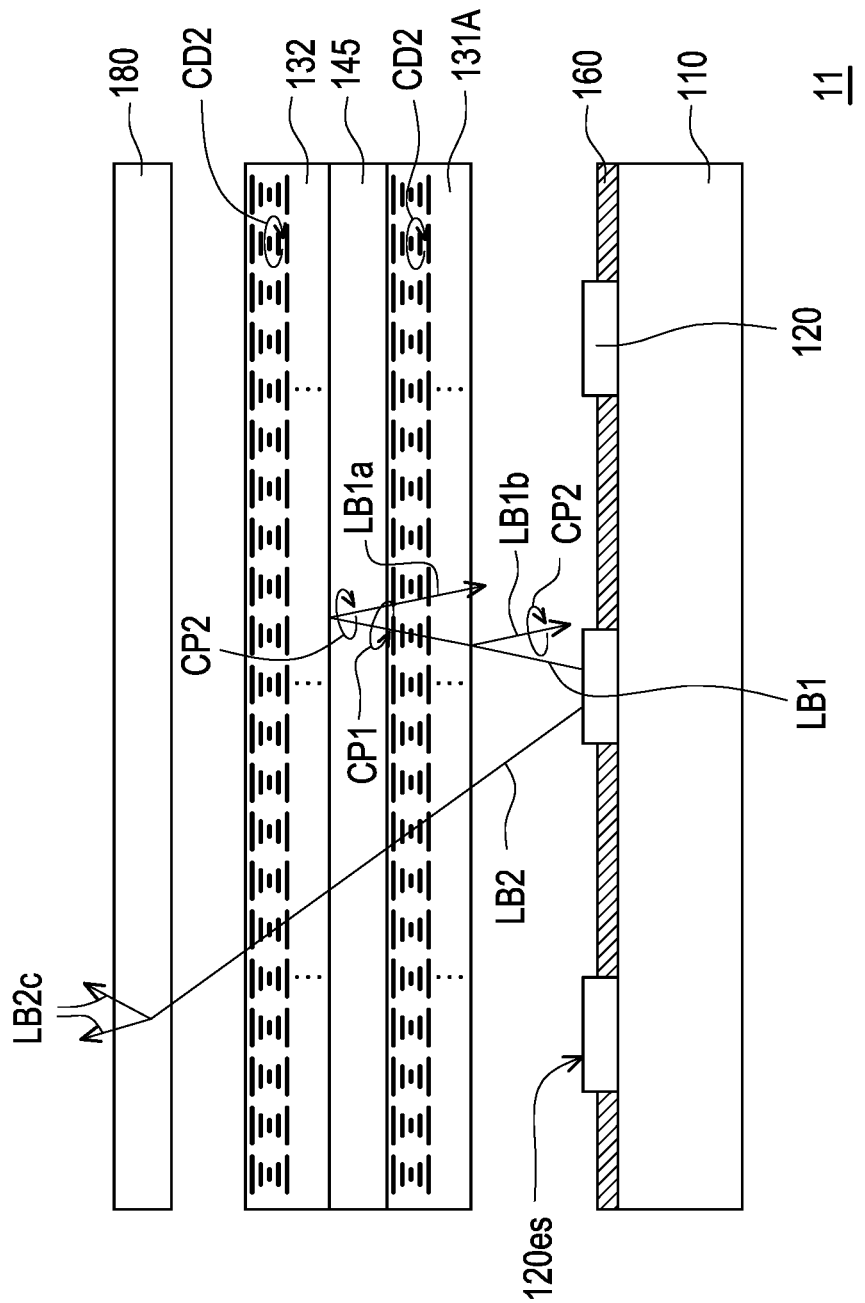
FIG. 2 is a schematic cross-sectional view of a backlight module according to the second embodiment of the invention.

FIG. 2 is a schematic cross-sectional view of a backlight module according to the second embodiment of the invention. Referring to FIG. 2, the difference between a backlight module 11 of the present embodiment and the backlight module 10 of FIG. 1 is that in the backlight module 11, the light-transmitting substrate 140 of the backlight module 10 is replaced by a half-wave plate 145. Therefore, in the present embodiment, the chiral directions of the first cholesteric liquid-crystal layer 131A and the second cholesteric liquid-crystal layer 132 may be optionally the same. For example: the two cholesteric liquid-crystal layers both have the second chiral direction CD2. However, the invention is not limited thereto. In other embodiments, the two cholesteric liquid-crystal layers may both have the first chiral direction CD1.

Specifically, in the present embodiment, after the light LB1 emitted from the light-emitting devices 120 in a more forward direction is incident on the first cholesteric liquid-crystal layer 131A, the light component having the second circular polarization state CP2 (i.e., the sub-light LB1b) is reflected by the first cholesteric liquid-crystal layer 131A, and the light component having the first circular polarization state CP1 (i.e., the sub-light LB1a) passes through the first cholesteric liquid-crystal layer 131A. It is particularly noted that the sub-light LB1a passes through the half-wave plate 145 before being incident on the second cholesteric liquid-crystal layer 132, so that the first circular polarization state CP1 is converted to the second circular polarization state CP2 after passing through the half-wave plate 145. Since the second chiral direction CD2 of the second cholesteric liquid-crystal layer 132 is the same as the polarization rotation state of the sub-light LB1a, the sub-light LB1a passing through the first cholesteric liquid-crystal layer 131A and the half-wave plate 145 is reflected by the second cholesteric liquid-crystal layer 132.

Since the effect of the combination of the first cholesteric liquid-crystal layer 131A, the half-wave plate 145, and the second cholesteric liquid-crystal layer 132 of the present embodiment on the backlight module 11 is similar to the effect of the combination of the first cholesteric liquid-crystal layer 131 and the second cholesteric liquid-crystal layer 132 of FIG. 1 on the backlight module 10, for detailed description, please refer to the relevant paragraphs of the above embodiments, which is not repeated herein. In particular, the arrangement of the half-wave plate 145 may increase the material selection flexibility of the two cholesteric liquid-crystal layers.

Figure 3:
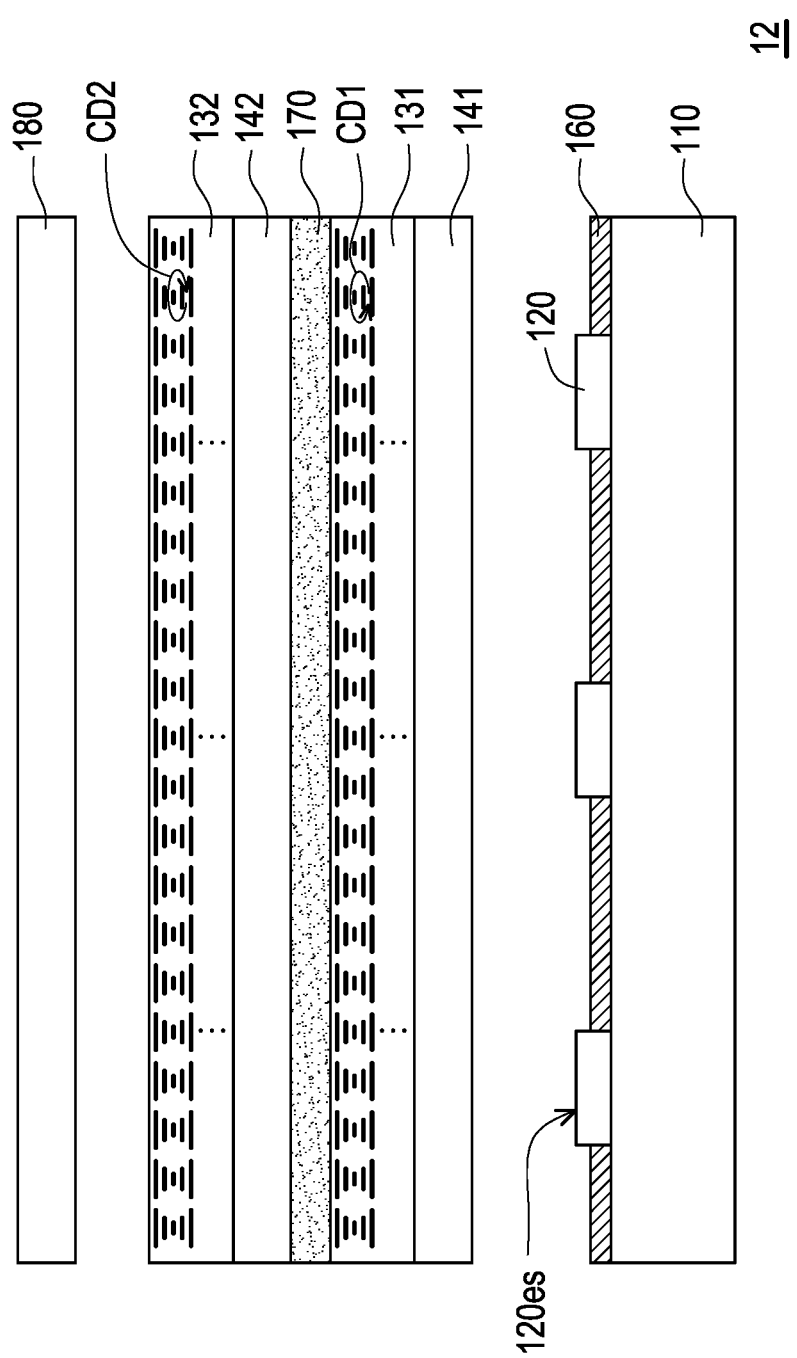
FIG. 3 is a schematic cross-sectional view of a backlight module according to the third embodiment of the invention.

FIG. 3 is a schematic cross-sectional view of a backlight module according to the third embodiment of the invention. Please refer to FIG. 3, the difference between a backlight module 12 of the present embodiment and the backlight module 10 of FIG. 1 is: the first cholesteric liquid-crystal layer 131 and the second cholesteric liquid-crystal layer 132 of the backlight module 12 of the present embodiment are respectively disposed on different light-transmitting substrates. For example: the first cholesteric liquid-crystal layer 131 is disposed on the first light-transmitting substrate 141, and the second cholesteric liquid-crystal layer 132 is disposed on the second light-transmitting substrate 142, and an optical adhesive layer 170 may also be provided between the two cholesteric liquid-crystal layers. More specifically, the first light-transmitting substrate 141 provided with the first cholesteric liquid-crystal layer 131 and the second light-transmitting substrate 142 provided with the second cholesteric liquid-crystal layer 132 may be attached to each other via the optical adhesive layer 170. The optical adhesive layer 170 here is, for example, an optical clear adhesive (OCA), a hardened optical clear resin (OCR), or an optical pressure sensitive adhesive (PSA).

Figure 4:
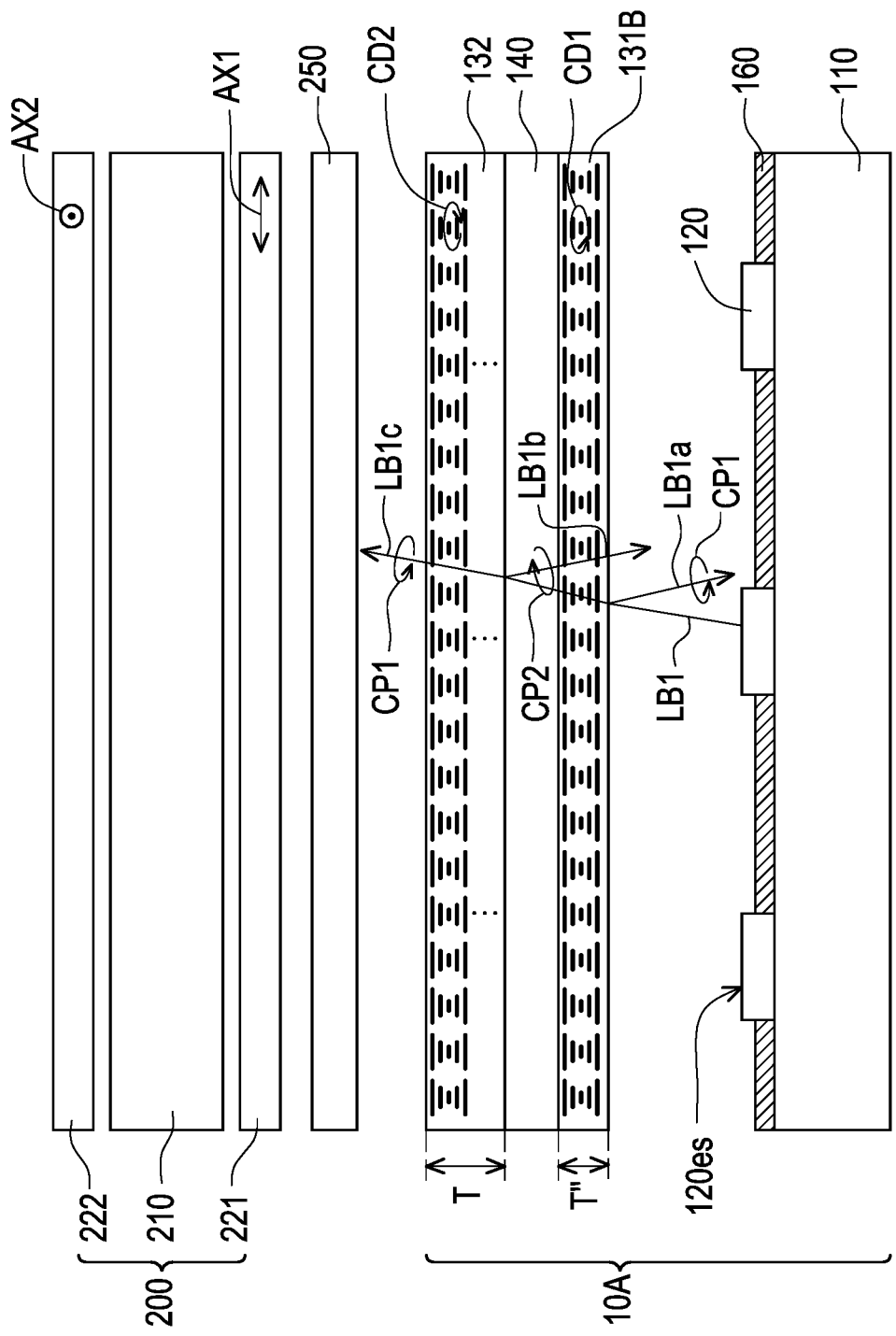
FIG. 4 is a schematic cross-sectional view of a display apparatus according to an embodiment of the invention.
Figure 5:
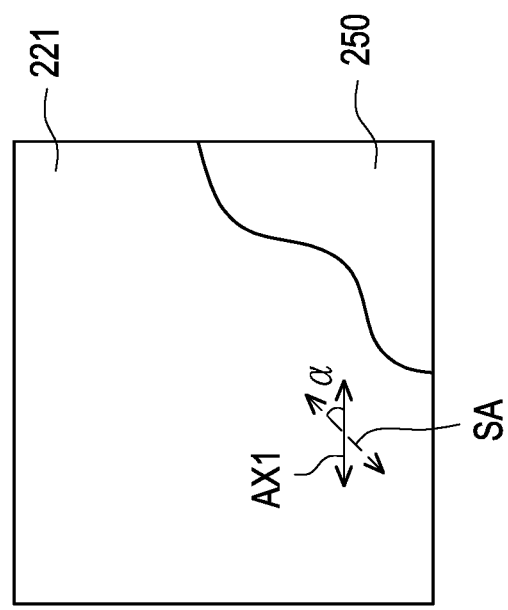
FIG. 5 is a schematic top view of the polarizer and the quarter-wave plate of FIG. 4.

FIG. 4 is a schematic cross-sectional view of a display apparatus according to an embodiment of the invention. FIG. 5 is a schematic top view of the polarizer and the quarter-wave plate of FIG. 4. Please refer to FIG. 4, the difference between a backlight module 10A of the present embodiment and the backlight module 10 of FIG. 1 is that the film thickness configuration of the two cholesteric liquid-crystal layers is different.

In the present embodiment, a first cholesteric liquid-crystal layer 131B and the second cholesteric liquid-crystal layer 132 of the backlight module 10A may have different film thicknesses. For example, a film thickness T" of the first cholesteric liquid-crystal layer 131B may be optionally less than the film thickness T of the second cholesteric liquid-crystal layer 132. Therefore, a portion of the light energy of the light LB1 emitted from the light-emitting devices 120 in a more forward direction may pass through the first cholesteric liquid-crystal layer 131B and the second cholesteric liquid-crystal layer 132 in a specific polarization state.

Specifically, since the film thickness of the first cholesteric liquid-crystal layer 131B is thinner than that of the second cholesteric liquid-crystal layer 132, the reflectivity of the first cholesteric liquid-crystal layer 131B to the light component having the first circular polarization state CP1 in the light LB1 is less than the reflectivity of the second cholesteric liquid-crystal layer 132 to the light component having the second circular polarization state CP2 in the light LB1. When the film thickness of the second cholesteric liquid-crystal layer 132 is thick enough (for example, more than ten times the pitch), the reflectivity of the second cholesteric liquid-crystal layer 132 to the light LB1 may be substantially close to 50% (that is, the reflectivity of the light component having the second circular polarization state CP2 is close to 100%). Conversely, when the first cholesteric liquid-crystal layer 131B is thinner (for example, less than ten times the pitch), the reflectivity of the first cholesteric liquid-crystal layer 131B to the light LB1 cannot reach 50% (that is, the reflectivity of the light component having the first circular polarization state CP1 may not be close to 100%). Therefore, a portion of the light component of the light LB1 having the first circular polarization state CP1 (i.e., a sub-light LB1c) passes through two cholesteric liquid-crystal layers.

In other words, the light emitted by the backlight module 10A of the present embodiment may have the first circular polarization state CP1, but the invention is not limited thereto. In other embodiments, the relative film thickness relationship between the first cholesteric liquid-crystal layer and the second cholesteric liquid-crystal layer may also be adjusted so that the light emitted by the backlight module has the second circular polarization state CP2. For example, the film thickness of the first cholesteric liquid-crystal layer is made to be greater than ten times the pitch, and the film thickness of the second cholesteric liquid-crystal layer is made to be less than ten times the pitch.

In the present embodiment, the backlight module 10A may be used as the backlight source of a display panel 200, and is overlapped with the display panel 200 to form a display apparatus 1. The display panel 200 has a liquid-crystal cell 210 and two polarizers 221 and 222 disposed at two opposite sides of the liquid-crystal cell 210, wherein the polarizer 221 is located between the liquid-crystal cell 210 and the backlight module 10A, and an absorption axis AX1 of the polarizer 221 may be optionally perpendicular to an absorption axis AX2 of the polarizer 222, but the invention is not limited thereto. In other embodiments, the axial directions of the absorption axes AX1 and AX2 of the two polarizers 221 and 222 may also be set to be parallel to each other according to the operation mode of the liquid-crystal cell 210 (for example: twisted-nematic mode, vertical alignment mode, horizontal electric field mode, optical compensation birefringence mode, etc.)

It should be mentioned that, in order to increase the light energy utilization rate of the display apparatus 1, a quarter-wave plate 250 may be further provided between the polarizer 221 of the display panel 200 and the backlight module 10A, wherein an included angle α between a slow axis SA of the quarter-wave plate 250 and the absorption axis AX1 of the polarizer 221 is 45 degrees (as shown in FIG. 5).

Figure 6:
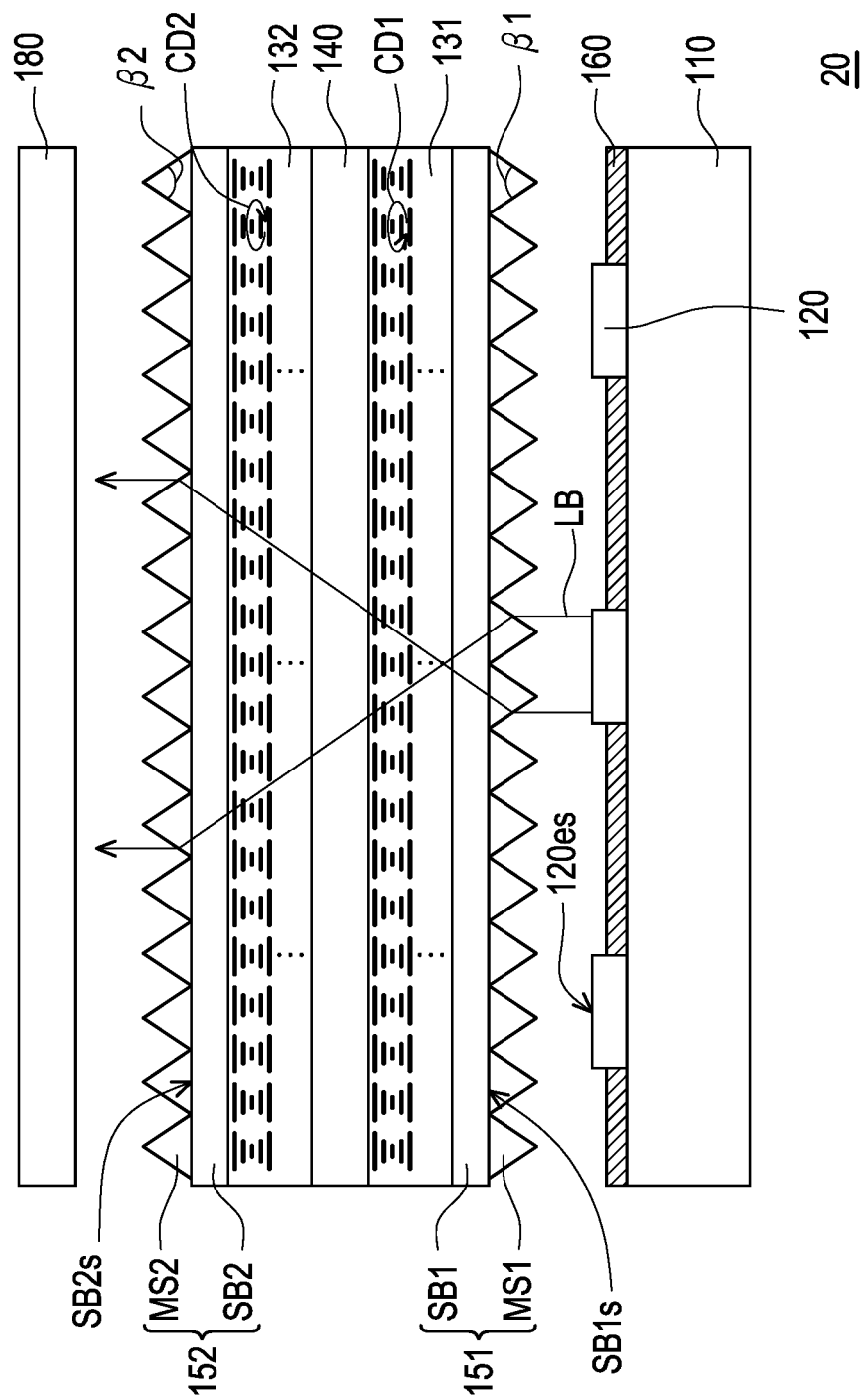
FIG. 6 is a schematic cross-sectional view of a backlight module according to the fourth embodiment of the invention.

FIG. 6 is a schematic cross-sectional view of a backlight module according to the fourth embodiment of the invention. Please refer to FIG. 6. Compared with the backlight module 10 of FIG. 1, a backlight module 20 of the present embodiment may further include a first optical film 151 and a second optical film 152. The first optical film 151 is disposed between the light-emitting devices 120 and the first cholesteric liquid-crystal layer 131. The second optical film 152 is disposed between the second cholesteric liquid-crystal layer 132 and the wavelength conversion layer 180. In detail, the first optical film 151 has a first substrate SB1 and a plurality of first optical microstructures MS1, and the first optical microstructures MS1 are disposed on a surface SB1s of the first substrate SB1 facing the plurality of light-emitting devices 120. The second optical film 152 has a second substrate SB2 and a plurality of second optical microstructures MS2, and these second optical microstructures MS2 are disposed on a surface SB2s of the second substrate SB2 facing the wavelength conversion layer 180.

Since the configuration and functions of other members of the present embodiment are all similar to those of the backlight module 10 in FIG. 1, for detailed description, please refer to the relevant paragraphs of the above embodiments, which is not repeated herein.

In the present embodiment, the first optical microstructures MS1 and the second optical microstructures MS2 are, for example, prism structures, and respectively have a vertex angle β1 and a vertex angle β2 away from the first substrate SB1 and the second substrate SB2. Preferably, the vertex angle β1 of the first optical microstructures MS1 and the vertex angle β2 of the second optical microstructures MS2 may be less than 120 degrees. For example, in the present embodiment, the two vertex angles of the first optical microstructures MS1 and the second optical microstructures MS2 may be optionally the same, but the invention is not limited thereto. In other embodiments, the two vertex angles of the first optical microstructures MS1 and the second optical microstructures MS2 may also be designed to be different according to the requirements of the light output type or the light output uniformity of the backlight module.

It should be mentioned that, in the present embodiment, after passing through the first optical microstructures MS1 of the first optical film 151, a light LB emitted in a more forward direction in the light emitted by the light-emitting devices 120 is deflected and incident on the first cholesteric liquid-crystal layer 131 and the second cholesteric liquid-crystal layer 132 at a larger angle. After the light LB passes through the second cholesteric liquid-crystal layer 132 and is incident on the second optical microstructures MS2 of the second optical film 152, the light LB is deflected to a more forward direction and exit the second optical film 152. The forward direction here is, for example, the normal direction of the light-emitting surface 120es (or the surface SB2s).

Via the arrangement of these two optical films, the light LB emitted by the light-emitting devices 120 in a more forward direction may be directed away from the region directly above the light-emitting devices 120 (for example: located between two adjacent light-emitting devices 120 and not overlapped with the region of the light-emitting devices 120). In other words, the configuration of the two optical films above may further improve the overall light output uniformity of the backlight module.

Figure 7:
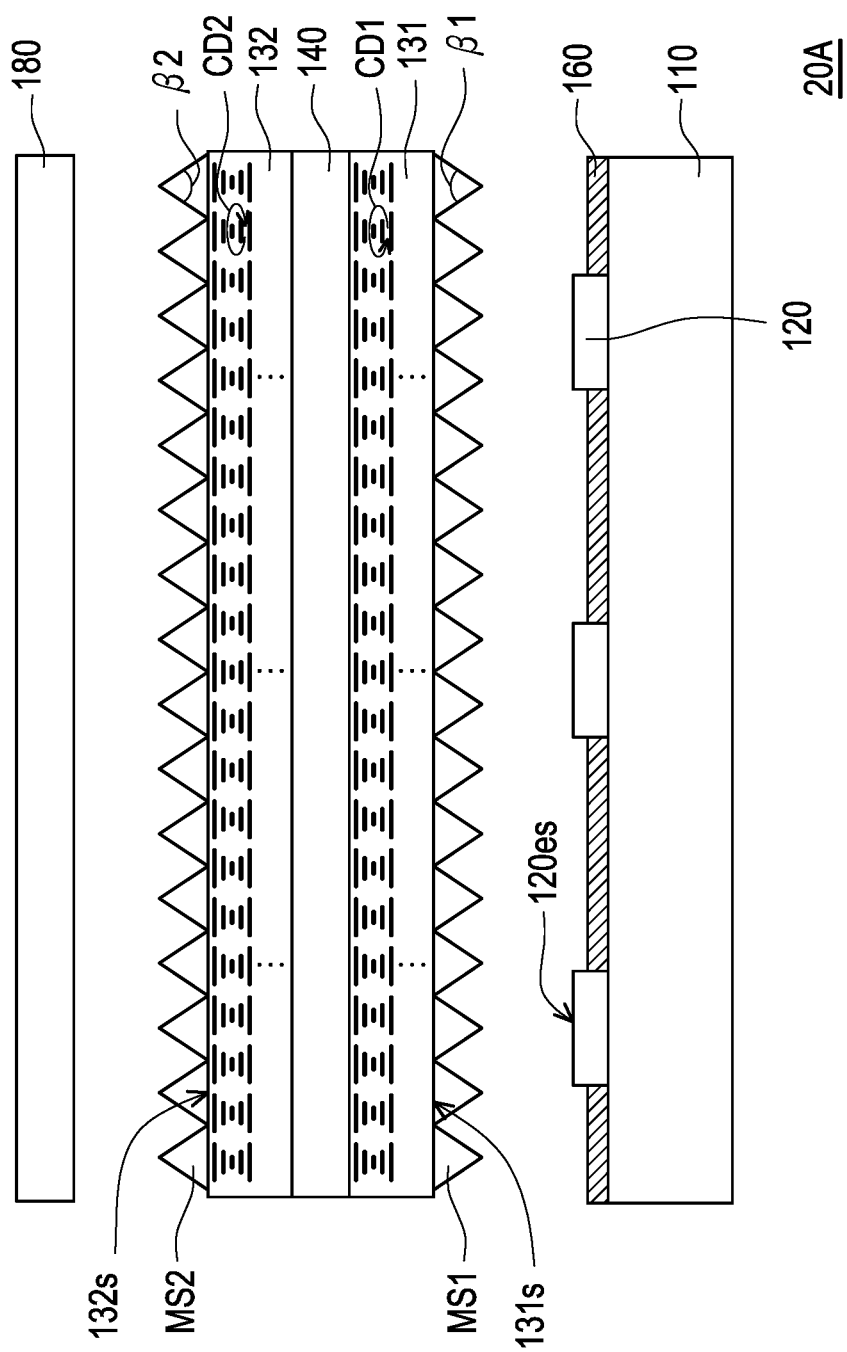
FIG. 7 is a schematic cross-sectional view of a backlight module according to the fifth embodiment of the invention.

FIG. 7 is a schematic cross-sectional view of a backlight module according to the fifth embodiment of the invention. Please refer to FIG. 7, the difference between a backlight module 20A of the present embodiment and the backlight module 20 of FIG. 6 is that the configuration of the optical microstructures is different. In the present embodiment, in the backlight module 20A, a surface 131s of the first cholesteric liquid-crystal layer 131 facing the plurality of light-emitting devices 120 may be directly provided with the plurality of first optical microstructures MS1, and a surface 132s of the second cholesteric liquid-crystal layer 132 facing the wavelength conversion layer 180 may be directly provided with the plurality of second optical microstructures MS2.

Since the effect of the optical microstructures MS1 and the optical microstructures MS2 of the present embodiment in the backlight module 20A is similar to the effect of the optical microstructures of FIG. 6 on the backlight module 20, for detailed description, please refer to the relevant paragraphs of the above embodiments, which is not repeated herein.

Figure 8:
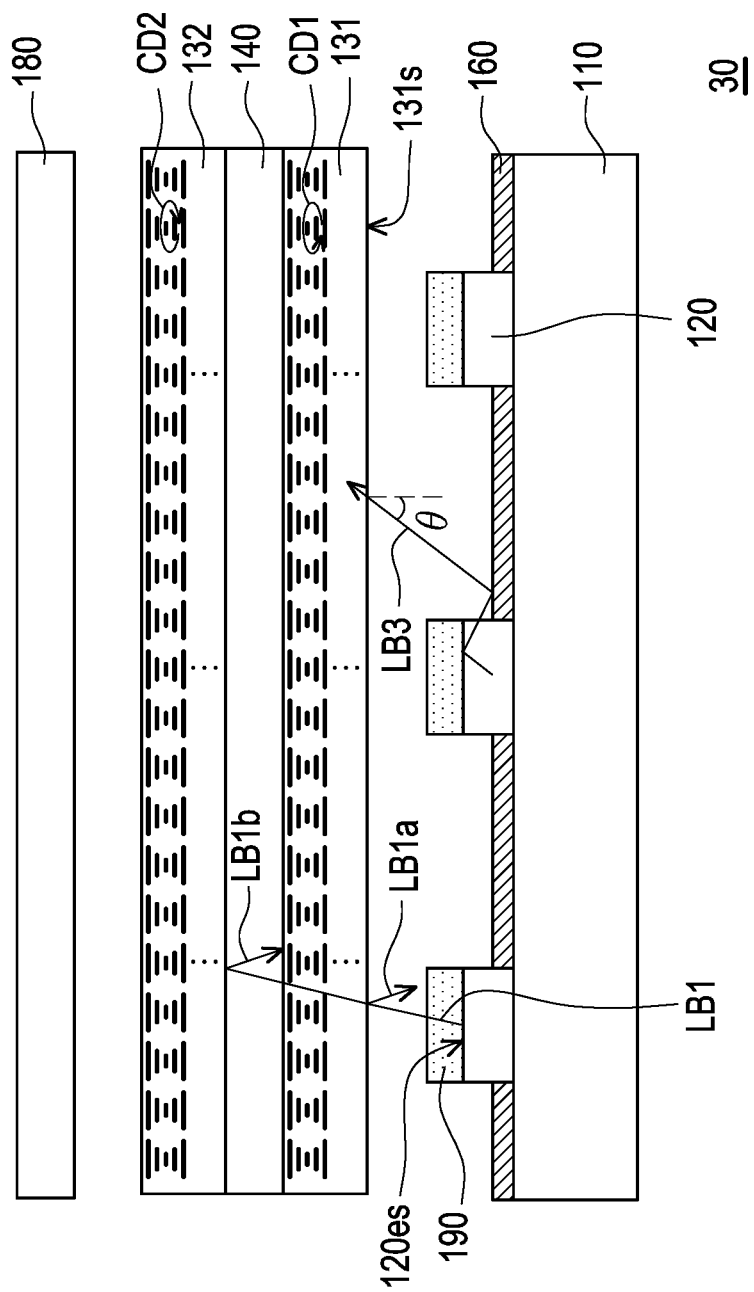
FIG. 8 is a schematic cross-sectional view of a backlight module according to the sixth embodiment of the invention.
Figure 9A:
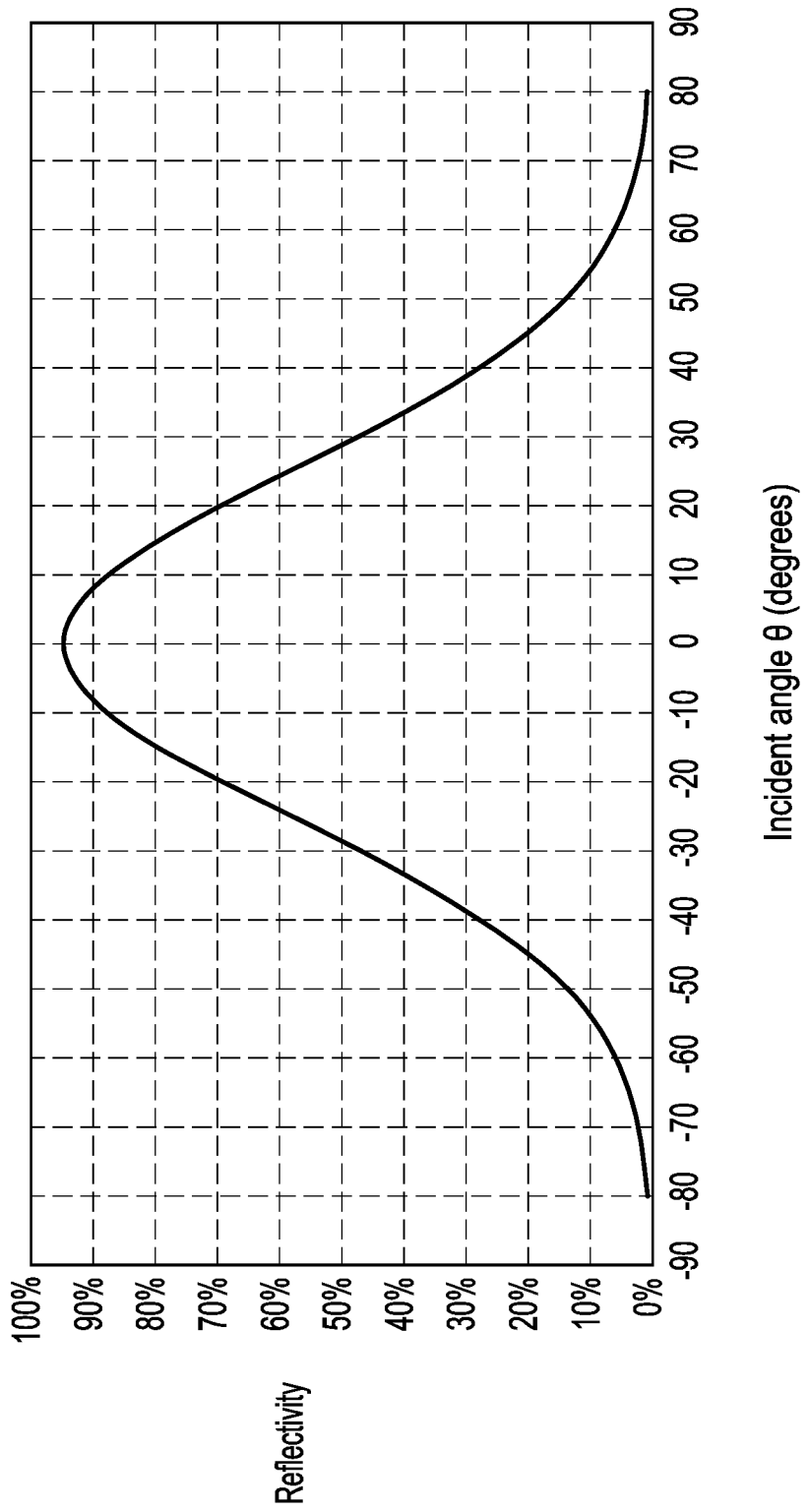
FIG. 9A is a graph of reflectivity versus incident angle of the first cholesteric liquid-crystal layer and the second cholesteric liquid-crystal layer of FIG. 8.
Figure 9B:
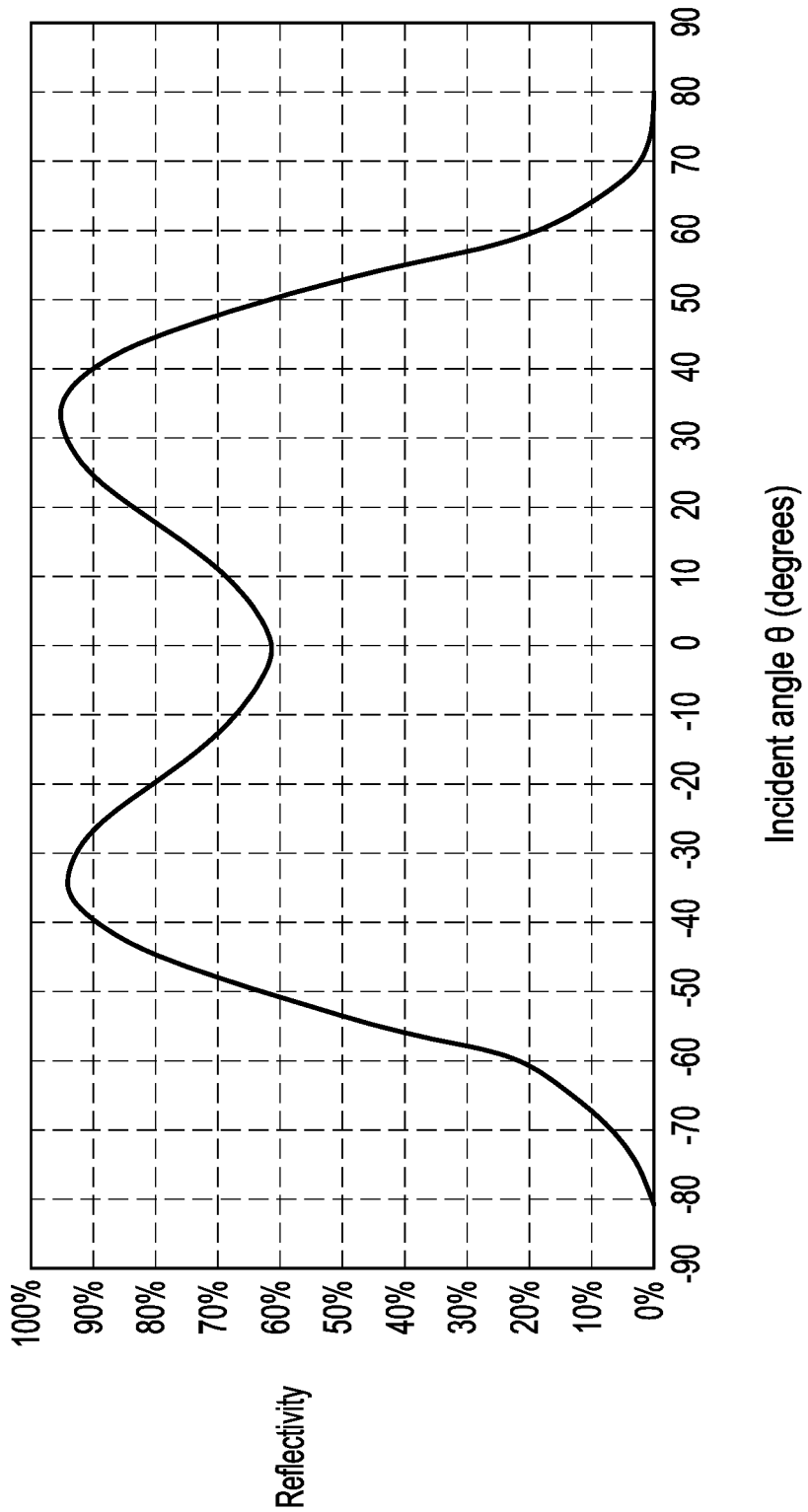
FIG. 9B and FIG. 9C are graphs of reflectivity versus incident angle of the first cholesteric liquid-crystal layer and the second cholesteric liquid-crystal layer according to some other modified embodiments of the backlight module of FIG. 8.
Figure 9C:
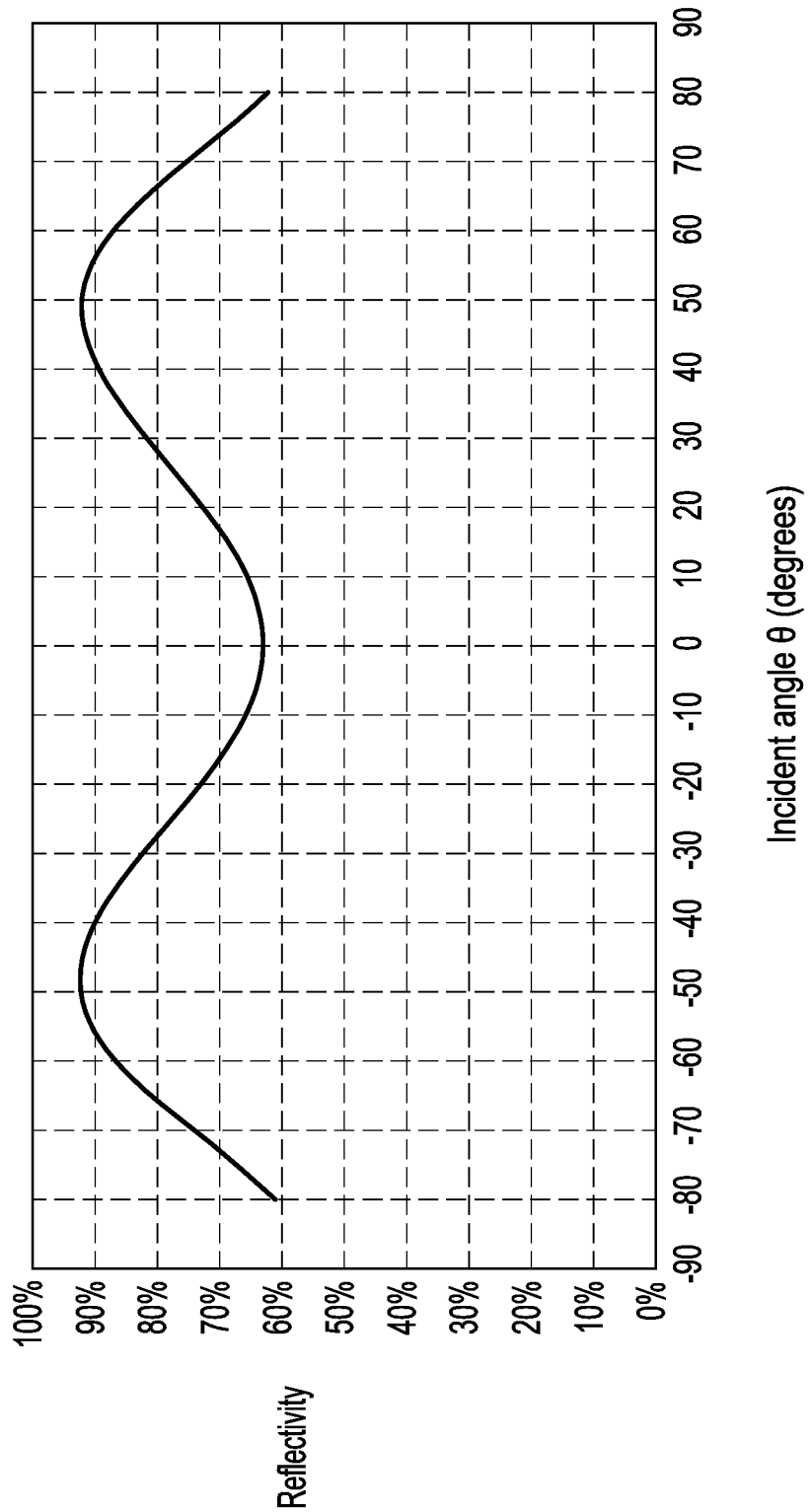

FIG. 8 is a schematic cross-sectional view of a backlight module according to the sixth embodiment of the invention. FIG. 9A is a graph of reflectivity versus incident angle of the first cholesteric liquid-crystal layer and the second cholesteric liquid-crystal layer of FIG. 8. FIG. 9B and FIG. 9C are graphs of reflectivity versus incident angle of the first cholesteric liquid-crystal layer and the second cholesteric liquid-crystal layer according to some other modified embodiments of the backlight module of FIG. 8. Referring to FIG. 8, the difference between a backlight module 30 of the present embodiment and the backlight module 10 of FIG. 1 is that the light-emitting surface 120es of the light-emitting devices 120 of the backlight module 30 may also be provided with an encapsulation pattern 190, and the encapsulation pattern 190 may have different degrees of reflectivity. In the present embodiment, the encapsulation pattern 190 may be formed by a thinned metal layer or an encapsulation adhesive doped with a reflective particle.

When the encapsulation pattern 190 has a reflectivity greater than 0%, a portion of the light (for example, a light LB3) emitted by the light-emitting devices 120 is reflected by the encapsulation pattern 190 to the side of the light-emitting devices 120. Therefore, in order to match the encapsulation pattern 190 having different degrees of reflectivity, the first cholesteric liquid-crystal layer 131 and the second cholesteric liquid-crystal layer 132 may have different light reflectivity distributions at different incident angles θ. For example, when the reflectivity of the encapsulation pattern 190 is greater, more light is reflected to the side, and the incident angle θ at which the first cholesteric liquid-crystal layer 131 and the second cholesteric liquid-crystal layer 132 have the maximum reflectivity is also greater. Accordingly, the chance of light transmission in the lateral direction may be increased, and the overall light output uniformity of the backlight module 30 may be improved. The incident angle θ here is, for example, the included angle between the optical path of the incident light and the normal direction of the surface 131s of the first cholesteric liquid-crystal layer 131 facing the light-emitting devices 120.

For example, when the reflectivity of the encapsulation pattern 190 is between 0% and 20%, since most of the light (for example, the light LB1) is still emitted through the light-emitting surface 120es and penetrates the encapsulation pattern 190, the first cholesteric liquid-crystal layer 131 and the second cholesteric liquid-crystal layer 132 may have the maximum reflectivity for light having the incident angle θ between 0 degrees and 30 degrees, and the maximum reflectivity is between 80% and 100% (as shown in FIG. 9A). Accordingly, the formation of brighter light directly above the light-emitting devices 120 causing a hot spot phenomenon may be avoided, thus helping to improve the light output uniformity of the backlight module 30.

When the reflectivity of the encapsulation pattern 190 is between 20% and 50%, since the proportion of light reflected to the side of the light-emitting devices 120 is increased, the first cholesteric liquid-crystal layer 131 and the second cholesteric liquid-crystal layer 132 may have maximum reflectivity for light having the incident angle θ between 20 degrees and 60 degrees, and the maximum reflectivity is between 60% and 100% (as shown in FIG. 9B). Therefore, the light having the incident angle θ between 20 degrees and 60 degrees may be reflected by the first cholesteric liquid-crystal layer 131 and the second cholesteric liquid-crystal layer 132 to be transmitted laterally, thereby improving the light output uniformity of the backlight module 30.

When the reflectivity of the encapsulation pattern 190 is between 50% and 100%, since the proportion of light reflected to the side of the light-emitting devices 120 is increased, the first cholesteric liquid-crystal layer 131 and the second cholesteric liquid-crystal layer 132 may have maximum reflectivity for light having the incident angle θ between 40 degrees and 80 degrees, and the maximum reflectivity is between 60% and 100% (as shown in FIG. 9C). Therefore, the light having the incident angle θ between 40 degrees and 80 degrees may be reflected by the first cholesteric liquid-crystal layer 131 and the second cholesteric liquid-crystal layer 132 to be transmitted laterally, thereby improving the light output uniformity of the backlight module 30.

Based on the above, in the backlight module and the display apparatus of an embodiment of the invention, by arranging two cholesteric liquid-crystal layers having the same or opposite chiral directions on the light-emitting side of the light-emitting devices, a portion of the forward light emitted by the light-emitting devices may be directed to a region not overlapped with the light-emitting devices, so as to effectively improve the overall light uniformity of the backlight module. Moreover, compared with the general use of a light-shielding film technique having light-shielding dots, the cholesteric liquid-crystal layers and the light-emitting devices of the invention do not have issues in assembly accuracy. Therefore, the manufacturing process flexibility of the backlight module is better and the production cost is also lower.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
   a circuit substrate;
   a plurality of light-emitting devices, disposed on the circuit substrate and electrically connected to the circuit substrate;
   a first cholesteric liquid-crystal layer, disposed on the light-emitting devices and overlapped with a light-emitting surface of each of the light-emitting devices; and
   a second cholesteric liquid-crystal layer, disposed on the first cholesteric liquid-crystal layer and overlapped with the first cholesteric liquid-crystal layer, wherein the first cholesteric liquid-crystal layer and the second cholesteric liquid-crystal layer respectively have a first chiral direction and a second chiral direction.

2. The backlight module of claim 1, wherein the first cholesteric liquid-crystal layer and the second cholesteric liquid-crystal layer each have a pitch P of a cholesteric helix, and a film thickness T of each of the first cholesteric liquid-crystal layer and the second cholesteric liquid-crystal layer satisfies the following relationship: $3 \times P \leq T \leq 20 \times P$.

3. The backlight module of claim 1, further comprising:
   a light-transmitting substrate, disposed between the first cholesteric liquid-crystal layer and the second cholesteric liquid-crystal layer.

4. The backlight module of claim 1, further comprising:
   a half-wave plate, disposed between the first cholesteric liquid-crystal layer and the second cholesteric liquid-crystal layer, wherein the first chiral direction of the first cholesteric liquid-crystal layer is the same as the second chiral direction of the second cholesteric liquid-crystal layer.

5. The backlight module of claim 1, wherein the first cholesteric liquid-crystal layer is disposed on a first light-transmitting substrate, and the second cholesteric liquid-crystal layer is disposed on a second light-transmitting substrate.

6. The backlight module of claim 5, wherein an optical adhesive layer is further provided between the first cholesteric liquid-crystal layer and the second cholesteric liquid-crystal layer.

7. The backlight module of claim 1, wherein a film thickness of the first cholesteric liquid-crystal layer is different from a film thickness of the second cholesteric liquid-crystal layer.

8. The backlight module of claim 1, further comprising:
   a wavelength conversion layer, disposed at a side of the first cholesteric liquid-crystal layer and the second cholesteric liquid-crystal layer away from the light-emitting devices, and overlapped with the light-emitting surface of each of the light-emitting devices.

9. The backlight module of claim 8, further comprising:
   a first optical film, disposed between the light-emitting devices and the first cholesteric liquid-crystal layer, wherein the first optical film has a first substrate and a plurality of first optical microstructures, and the first optical microstructures are disposed at a surface of the first substrate facing the light-emitting devices.

10. The backlight module of claim 9, wherein the first optical microstructures are a plurality of prism structures, each of the prism structures has a vertex angle away from the first substrate, and the vertex angle is less than 120 degrees.

11. The backlight module of claim 9, further comprising:
a second optical film, disposed between the second cholesteric liquid-crystal layer and the wavelength conversion layer, wherein the second optical film has a second substrate and a plurality of second optical microstructures, and the second optical microstructures are disposed at a surface of the second substrate facing the wavelength conversion layer.

12. The backlight module of claim 11, wherein the second optical microstructures are a plurality of prism structures, each of the prism structures has a vertex angle away from the second substrate, and the vertex angle is less than 120 degrees.

13. The backlight module of claim 8, wherein a surface of the first cholesteric liquid-crystal layer facing the light-emitting devices is provided with a plurality of first prism structures, each of the first prism structures has a first vertex angle away from the first cholesteric liquid-crystal layer, and the first vertex angle is less than 120 degrees.

14. The backlight module of claim 13, wherein a surface of the second cholesteric liquid-crystal layer facing the wavelength conversion layer is provided with a plurality of second prism structures, each of the second prism structures has a second vertex angle away from the second cholesteric liquid-crystal layer, and the second vertex angle is less than 120 degrees.

15. The backlight module of claim 1, further comprising:
a reflective layer, disposed on the circuit substrate and located between the light-emitting devices.

16. The backlight module of claim 15, wherein the light-emitting surface of each of the light-emitting devices is provided with an encapsulation pattern, and a reflectivity of the encapsulation pattern is between 0% and 20%, the first cholesteric liquid-crystal layer and the second cholesteric liquid-crystal layer are suitable for reflecting a light from each of the light-emitting devices, there is an incident angle between an optical path of the light and a normal direction of a surface of the first cholesteric liquid-crystal layer toward the light-emitting devices, the first cholesteric liquid-crystal layer and the second cholesteric liquid-crystal layer have a maximum reflectivity for the light having the incident angle between 0 degrees and 30 degrees, and the maximum reflectivity is between 80% and 100%.

17. The backlight module of claim 15, wherein the light-emitting surface of each of the light-emitting devices is provided with an encapsulation pattern, and a reflectivity of the encapsulation pattern is between 20% and 50%, the first cholesteric liquid-crystal layer and the second cholesteric liquid-crystal layer are suitable for reflecting a light from the reflective layer, there is an incident angle between an optical path of the light and a normal direction of a surface of the first cholesteric liquid-crystal layer toward the light-emitting devices, the first cholesteric liquid-crystal layer and the second cholesteric liquid-crystal layer have a maximum reflectivity for the light having the incident angle between 20 degrees and 60 degrees, and the maximum reflectivity is between 60% and 100%.

18. The backlight module of claim 15, wherein the light-emitting surface of each of the light-emitting devices is provided with an encapsulation pattern, and a reflectivity of the encapsulation pattern is between 50% and 100%, the first cholesteric liquid-crystal layer and the second cholesteric liquid-crystal layer are suitable for reflecting a light from the reflective layer, there is an incident angle between an optical path of the light and a normal direction of a surface of the first cholesteric liquid-crystal layer toward the light-emitting devices, the first cholesteric liquid-crystal layer and the second cholesteric liquid-crystal layer have a maximum reflectivity for the light having the incident angle between 40 degrees and 80 degrees, and the maximum reflectivity is between 60% and 100%.

19. A display apparatus, comprising:
a backlight module, comprising:
    a circuit substrate;
    a plurality of light-emitting devices, disposed on the circuit substrate and electrically connected to the circuit substrate;
    a first cholesteric liquid-crystal layer, disposed on the light-emitting devices and overlapped with a light-emitting surface of each of the light-emitting devices; and
    a second cholesteric liquid-crystal layer, disposed on the first cholesteric liquid-crystal layer and overlapped with the first cholesteric liquid-crystal layer, wherein the first cholesteric liquid-crystal layer and the second cholesteric liquid-crystal layer respectively have a first chiral direction and a second chiral direction;
a display panel, overlapped at the backlight module and having a liquid-crystal cell and a polarizer located between the liquid-crystal cell and the backlight module; and
a quarter-wave plate, disposed between the backlight module and the display panel, wherein an included angle between a slow axis of the quarter-wave plate and an absorption axis of the polarizer is 45 degrees.

20. The display apparatus of claim 19, wherein the backlight module further comprises:
a wavelength conversion layer, disposed at a side of the first cholesteric liquid-crystal layer and the second cholesteric liquid-crystal layer away from the light-emitting devices and overlapped with the light-emitting surface of each of the light-emitting devices.

* * * * *